(12) United States Patent
Zhu

(10) Patent No.: US 9,027,952 B2
(45) Date of Patent: May 12, 2015

(54) BABY CARRIAGE AND LOWER LEG REST DEVICE THEREOF

(75) Inventor: Wanquan Zhu, Guangdong (CN)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 242 days.

(21) Appl. No.: 13/590,171

(22) Filed: Aug. 20, 2012

(65) Prior Publication Data
US 2013/0062923 A1 Mar. 14, 2013

(30) Foreign Application Priority Data

Sep. 8, 2011 (CN) .......................... 2011 2 0336559
Feb. 20, 2012 (CN) .......................... 2012 1 0037860

(51) Int. Cl.
*B62B 5/08* (2006.01)
*B62B 7/14* (2006.01)
*B62B 9/12* (2006.01)

(52) U.S. Cl.
CPC . *B62B 7/142* (2013.01); *B62B 9/12* (2013.01); *B62B 7/145* (2013.01)

(58) Field of Classification Search
CPC ........... F16B 7/105; B62B 7/064; B62B 7/08; B62B 7/145
USPC ........... 280/642, 638, 35, 639, 641, 643, 647, 280/648, 650, 655, 657, 658, 47.38, 47.4, 280/47.41, 30; 403/109.3
See application file for complete search history.

(56) References Cited

U.S. PATENT DOCUMENTS

| | | | | |
|---|---|---|---|---|
| 1,202,601 A | * | 10/1916 | Snyder | ........................... 285/303 |
| 1,303,416 A | * | 5/1919 | Tidyman | ....................... 182/155 |
| 2,546,387 A | * | 3/1951 | Coffing | ........................... 279/79 |
| 2,755,106 A | * | 7/1956 | Chisholm et al. | .................. 285/7 |
| 3,375,541 A | * | 4/1968 | Fromknecht | .................. 15/327.2 |
| 3,704,850 A | * | 12/1972 | Hendrickson et al. | ...... 248/188.5 |
| 3,722,927 A | * | 3/1973 | Miska | ........................... 285/317 |
| 3,945,389 A | * | 3/1976 | Smith | ............................. 135/67 |
| 4,056,115 A | * | 11/1977 | Thomas | .......................... 135/67 |
| 4,079,965 A | * | 3/1978 | Moughty et al. | ................... 285/7 |
| 4,239,259 A | | 12/1980 | Martinez | |
| 4,247,216 A | * | 1/1981 | Pansini | ...................... 403/109.3 |
| 4,461,471 A | * | 7/1984 | Brastow | .......................... 482/68 |
| 4,494,270 A | * | 1/1985 | Ritzau et al. | ..................... 15/377 |

(Continued)

FOREIGN PATENT DOCUMENTS

CN 2587738 Y 11/2003
EP 2 332 807 A2 6/2011

(Continued)

*Primary Examiner* — Brodie Follman
(74) *Attorney, Agent, or Firm* — Winston Hsu; Scott Margo

(57) ABSTRACT

A lower leg rest device includes an engaging member and a support member having a length adjusting mechanism. An end of the support member is pivotally connected to the frame of the baby carriage at a pivot point. The engaging member is disposed on another end of the support member. The support member is used for supporting a child safety seat. The length adjusting mechanism is used for adjusting a length between the engaging member and the pivot point. When the lower leg rest device pivots to a position below the frame body, the length of the support member can be shortened so as to support legs of a baby seated in the baby carriage. When the lower leg rest device pivots to a position above the frame body, the support member can be lengthened so that the engaging member can be engaged with and support the child safety seat.

5 Claims, 17 Drawing Sheets

(56) References Cited

U.S. PATENT DOCUMENTS

| | | | | |
|---|---|---|---|---|
| 4,586,399 A * | 5/1986 | Kassai | | 74/551.3 |
| 4,830,035 A * | 5/1989 | Liu | | 135/67 |
| 4,941,689 A * | 7/1990 | Sjoberg | | 285/7 |
| 4,946,180 A | 8/1990 | Baer | | |
| 4,989,900 A * | 2/1991 | Steinhuser | | 280/808 |
| 5,197,753 A * | 3/1993 | Liu | | 280/642 |
| 5,460,410 A * | 10/1995 | Petzi et al. | | 280/801.2 |
| 5,462,380 A * | 10/1995 | Peek et al. | | 403/329 |
| 5,516,142 A * | 5/1996 | Hartan | | 280/642 |
| 5,778,914 A * | 7/1998 | Trani | | 135/66 |
| 6,062,589 A * | 5/2000 | Cheng | | 280/647 |
| 6,196,243 B1 * | 3/2001 | Chen | | 135/22 |
| 6,267,404 B1 * | 7/2001 | Yang et al. | | 280/642 |
| 6,431,607 B1 * | 8/2002 | Kittelmann et al. | | 285/7 |
| 6,478,503 B1 * | 11/2002 | Cheng | | 403/322.4 |
| 6,702,332 B2 * | 3/2004 | Young et al. | | 285/7 |
| 6,832,784 B1 * | 12/2004 | Chen | | 285/7 |
| 7,293,934 B1 * | 11/2007 | Huang | | 403/109.1 |
| 7,854,482 B2 * | 12/2010 | Chen et al. | | 297/487 |
| 7,874,303 B2 * | 1/2011 | Xie | | 135/120.3 |
| 7,959,191 B2 * | 6/2011 | Schouten | | 285/298 |
| 8,246,267 B2 * | 8/2012 | Svedberg | | 403/109.3 |
| 8,333,208 B2 * | 12/2012 | Miller | | 135/67 |
| 8,376,646 B2 * | 2/2013 | Melino et al. | | 403/109.3 |
| 8,414,012 B2 * | 4/2013 | Chen et al. | | 280/648 |
| 8,485,488 B2 * | 7/2013 | Forrest et al. | | 248/408 |
| 8,491,215 B2 * | 7/2013 | Young | | 403/109.3 |
| 8,888,123 B1 * | 11/2014 | Cheng | | 280/643 |
| 2002/0050700 A1 | 5/2002 | Stohr | | |
| 2002/0093177 A1 | 7/2002 | Chen | | |
| 2003/0111825 A1 | 6/2003 | Lo | | |
| 2004/0124611 A1 | 7/2004 | Gong et al. | | 280/642 |
| 2005/0123344 A1 * | 6/2005 | Bensussan | | 403/109.2 |
| 2006/0062632 A1 * | 3/2006 | Jang | | 403/109.6 |
| 2008/0169697 A1 * | 7/2008 | Chen et al. | | 297/487 |
| 2011/0175305 A1 * | 7/2011 | Chen et al. | | 280/30 |
| 2011/0175330 A1 | 7/2011 | Smith | | |
| 2013/0062923 A1 * | 3/2013 | Zhu | | 297/423.26 |
| 2013/0075992 A1 * | 3/2013 | Zhu | | 280/47.38 |
| 2013/0285353 A1 * | 10/2013 | Zhu | | 280/658 |
| 2014/0030012 A1 * | 1/2014 | Lee | | 403/326 |
| 2014/0130837 A1 * | 5/2014 | Sy-Facunda | | 135/120.3 |

FOREIGN PATENT DOCUMENTS

| | | |
|---|---|---|
| TW | 404367 | 9/2000 |
| WO | 02094633 A1 | 11/2002 |

* cited by examiner

BABY CARRIAGE AND LOWER LEG REST DEVICE THEREOF

BACKGROUND OF THE INVENTION

1. Field of the Invention

The invention relates to a lower leg rest device and, more particularly, to a lower leg rest device with simple structure adapted for a frame of a baby carriage.

2. Description of the Prior Art

As baby carriage has been used popularly, people pay more and more attention to functionality of the baby carriage and hope that a baby can feel comfortable within the baby carriage during travel. Therefore, a frame of the baby carriage is usually equipped with a lower leg rest device, which is usually disposed at a front end of a seat. In this manner, legs of the baby can be supported by the lower leg rest device while being seated in the baby carriage so as to make the baby feel comfortable. Since various demands on the baby carriage are increasing, most of conventional baby carriages have specific structure for engaging with a child safety seat. Accordingly, the baby carriage not only can be used for seating the baby immediately, but also can be assembled with the child safety seat. A support member is always necessary for supporting the child safety seat when the child safety seat is assembled on the baby carriage. To simplify the structure, the prior art has developed a lower leg rest device with a pivot structure. When the baby is seated in the baby carriage, his or her legs can be supported by the lower leg rest device below the frame. When the child safety seat is to be assembled on the baby carriage, the lower leg rest device can be pivoted to a position above the frame so as to utilize the lower leg rest device to engage with and support the child safety seat.

However, the lower leg rest device of the prior art usually comprises a support member and a fabric covering the support member. In order to be engaged with the child safety seat, a length of the support member is always too long such that the lower leg rest device cannot be simplified when the support member is covered by the fabric. On the other hand, the support member cannot be engaged with the child safety seat immediately if the length of the support member is too short.

Therefore, it is necessary to provide a lower leg rest device with simple structure and capable of supporting legs of the baby and the child safety seat, so as to solve the aforesaid problems.

SUMMARY OF THE INVENTION

An objective of the invention is to provide a lower leg rest device with simple structure and capable of supporting legs of the baby and the child safety seat.

Another objective of the invention is to provide a baby carriage equipped with a lower leg rest device, which has simple structure and is capable of supporting legs of the baby and the child safety seat.

To achieve the aforesaid objective, the invention provides a lower leg rest device pivotally connected to a frame of a baby carriage. The lower leg rest device comprises an engaging member and a support member having a length adjusting mechanism. An end of the support member is pivotally connected to the frame of the baby carriage at a pivot point. The engaging member is disposed on another end of the support member. The support member is used for supporting a child safety seat. The length adjusting mechanism is used for adjusting a length between the engaging member and the pivot point.

Preferably, the support member comprises a connecting tube and a support tube, the support tube is U-shaped, an end of the support tube is telescopically connected to an end of the connecting tube by the length adjusting mechanism, another end of the connecting tube is pivotally connected to the frame of the baby carriage, and the engaging member is disposed on the support tube.

Preferably, the connecting tube is hollow, an end of the support tube is telescopically accommodated in an end of the connecting tube, and the support tube is detachably engaged with the connecting tube by a lock member.

Preferably, in an embodiment of the invention, the lock member is a resilient plate, the resilient plate comprises an abutting portion with a bent shape, a positioning block protrudes from the abutting portion, the abutting portion is fixed in the support tube, the positioning block protrudes out of the support tube, and the positioning block is detachably engaged with the connecting tube.

Preferably, a first engaging hole is formed on the connecting tube and corresponding to the positioning block.

Preferably, an unlock button is disposed outside the connecting tube, an end of the unlock button is pivotally connected to the connecting tube, another end of the unlock button has a protruding block, and the protruding block is corresponding to the first engaging hole.

Preferably, in another embodiment of the invention, the lock member comprises an abutting plate, and the abutting plate is pivotally connected to the connecting tube and detachably engaged with the connecting tube and the support tube.

Preferably, a connecting portion, which is hollow, protrudes from an outer surface of the connecting tube, the abutting plate is pivotally connected in the connecting portion, a through hole is formed on the connecting tube and corresponding to the abutting plate, and the abutting plate passes through the through hole so as to be detachably engaged with the support tube.

Preferably, the abutting plate has a bent shape, an end of the abutting plate forms an engaging portion, another end of the abutting plate forms an abutting portion, the abutting plate is pivotally connected to the connecting portion, a spring, which is compressed, is disposed between the abutting portion and the connecting tube, and the engaging portion passes through the through hole so as to be detachably engaged with the support tube.

Preferably, an engaging groove is formed on the support tube and corresponding to the engaging portion.

Preferably, a first longitudinal groove is formed on the abutting plate, a second longitudinal groove is formed on the connecting portion, a specific angle is included between the first longitudinal groove and the second longitudinal groove, and a connecting button is inserted in the first longitudinal groove and the second longitudinal groove so as to connect the first longitudinal groove and the second longitudinal groove.

Preferably, in another embodiment of the invention, the length adjusting mechanism further comprises a connecting metal tube, the connecting metal tube is hollow, an end of the connecting metal tube is telescopically disposed in an end of the support tube, and the support tube is detachably engaged with the connecting metal tube by a lock member.

Preferably, the lock member is a resilient plate, the resilient plate comprises an abutting portion with a bent shape, a positioning block protrudes from the abutting portion, the abutting portion is fixed in the connecting metal tube, the positioning block protrudes out of the connecting metal tube, and the positioning block is detachably engaged with the support tube.

Preferably, a second engaging hole is formed on the support tube and corresponding to the positioning block.

Preferably, an unlock button is disposed outside the support tube, an end of the unlock button is pivotally connected to the support tube, another end of the unlock button has a protruding block, and the protruding block is corresponding to the second engaging hole.

Preferably, a restraining groove is formed on the connecting metal tube, a restraining pin is fixed on an end of the support tube, and the restraining pin is slidably disposed in the restraining groove.

Preferably, in another embodiment of the invention, the length adjusting mechanism comprises a rotating member, an end of the rotating member is rotatably connected to the support tube, and the engaging member is disposed on another end of the rotating member.

Preferably, the support member comprises a connecting tube and a support tube, the support tube is U-shaped, an end of the support tube is fixed on an end of the connecting tube, another end of the connecting tube is pivotally connected to the frame of the baby carriage, an end of the rotating member is rotatably connected to the support tube, and another end of the rotating member is tightly connected to the engaging member. The support tube of this embodiment is shortened to simplify the structure and the rotating member can be engaged with the child safety seat conveniently.

Preferably, the rotating member is rotatably disposed outside the support tube and detachably engaged with the support tube by an operating member.

Preferably, the operating member comprises a resilient positioning pillar, the resilient positioning pillar is fixed in the support tube and protrudes out of the support tube, a positioning hole is formed on the rotating member and corresponding to the resilient positioning pillar, and the resilient positioning pillar is detachably engaged with the positioning hole.

Preferably, the operating member further comprises a resilient plate with a bent shape, the resilient positioning pillar is disposed on an end of the resilient plate, the resilient plate is fixed in the support tube, and the resilient positioning pillar protrudes out of the support tube so as to be detachably engaged with the positioning hole.

Preferably, in another embodiment of the invention, the operating member comprises an operating button and a spring, the operating button is slidably connected to an end of the rotating member, the spring is elastically disposed between a rear end of the operating button and the rotating member, and a front end of the operating button is detachably engaged with the support tube.

Preferably, a positioning ring is fixed on a position of the support tube close to the operating member, and the front end of the operating button is detachably engaged with the positioning ring.

Preferably, in another embodiment of the invention, the lock member comprises a button, an engaging block and a resilient member, the engaging block is pivotally connected to the support tube, an end of the engaging block is detachably engaged with the connecting tube, the button is disposed on another end of the engaging block and protrudes out of the support tube, and the resilient member is elastically disposed between the engaging block and the support tube.

Preferably, the engaging block has a base portion, an end of the base portion has an engaging protrusion, the button is disposed on another end of the base portion, the engaging protrusion and the button extend toward opposite directions with respect to the base portion, and the resilient member and the button are located at an identical side of the base portion.

Preferably, a third engaging hole is formed on the connecting tube and corresponding to the engaging protrusion.

Preferably, a restraining groove is formed on the support tube, a restraining pin is disposed on the connecting tube, and the restraining pin is disposed in the restraining groove.

Correspondingly, the invention further provides a frame of a baby carriage comprising a frame body and the lower leg rest device. The lower leg rest device is pivotally connected to the frame body. When the lower leg rest device pivots to a position below the frame body, the lower leg rest device is used for supporting legs of a baby. When the lower leg rest device pivots to a position above the frame body, the lower leg rest device is used for engaging with and supporting the child safety seat.

Compared with the prior art, the lower leg rest device of the invention comprises the engaging member and the support member with the length adjusting mechanism, an end of the support member is pivotally connected to the frame of the baby carriage, and the engaging member is disposed on another end of the support member such that the length of the support member can be adjusted by the length adjusting mechanism. Accordingly, when the lower leg rest device pivots to a position below the frame body, the length of the support member can be shortened to form a simplified structure so as to support legs of a baby seated in the baby carriage. When the lower leg rest device pivots to a position above the frame body, the support member can be lengthened so that the engaging member disposed thereon can be engaged with and support the child safety seat. The lower leg rest device has simple structure and can be operated conveniently. The frame of the baby carriage equipped with the lower leg rest device of the invention can also achieve the aforesaid features.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
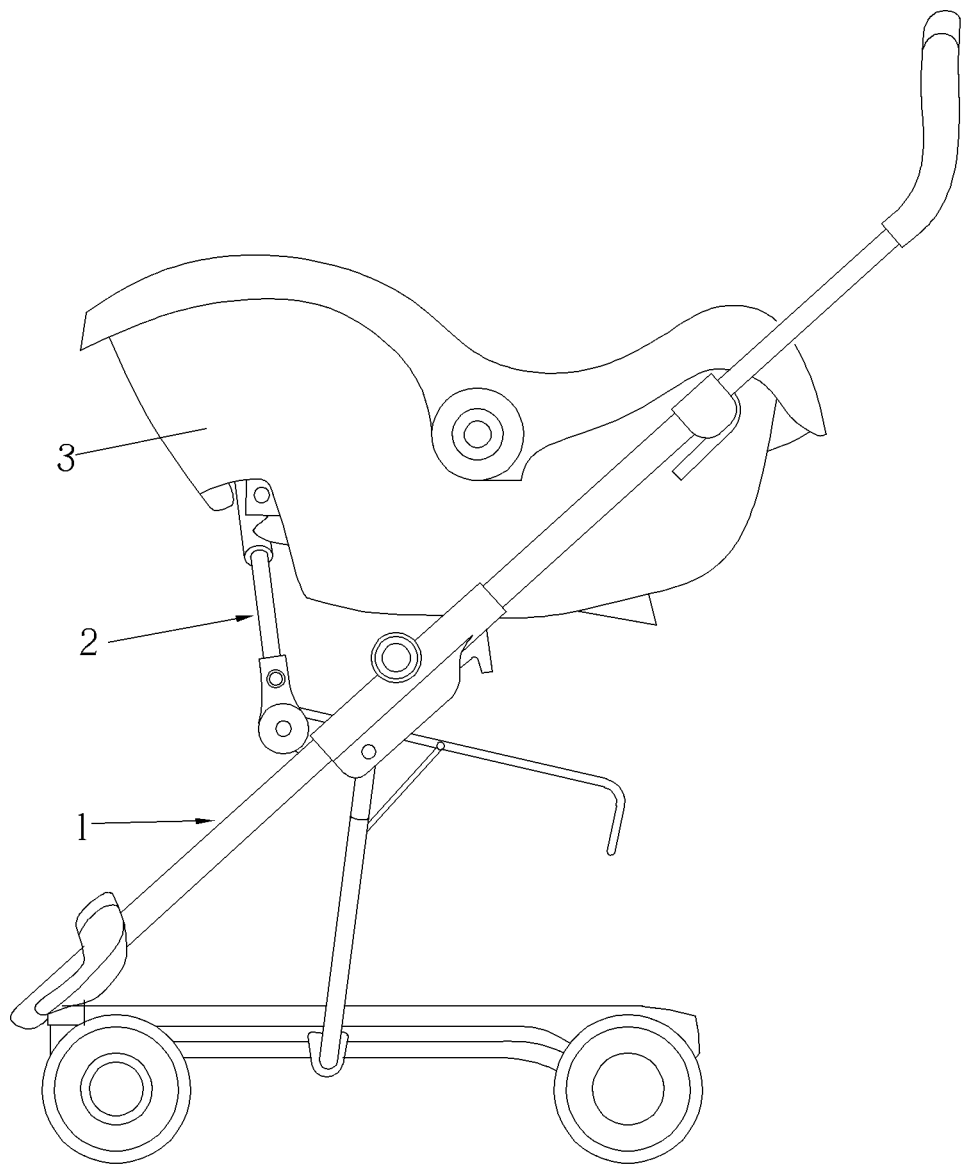
FIG. 1 is a schematic diagram illustrating a frame of a baby carriage of the invention engaged with a child safety seat.

There are several embodiments of the invention described in the following with the appended drawings, wherein the same numerals in the drawings represent the same elements.

Figure 2:
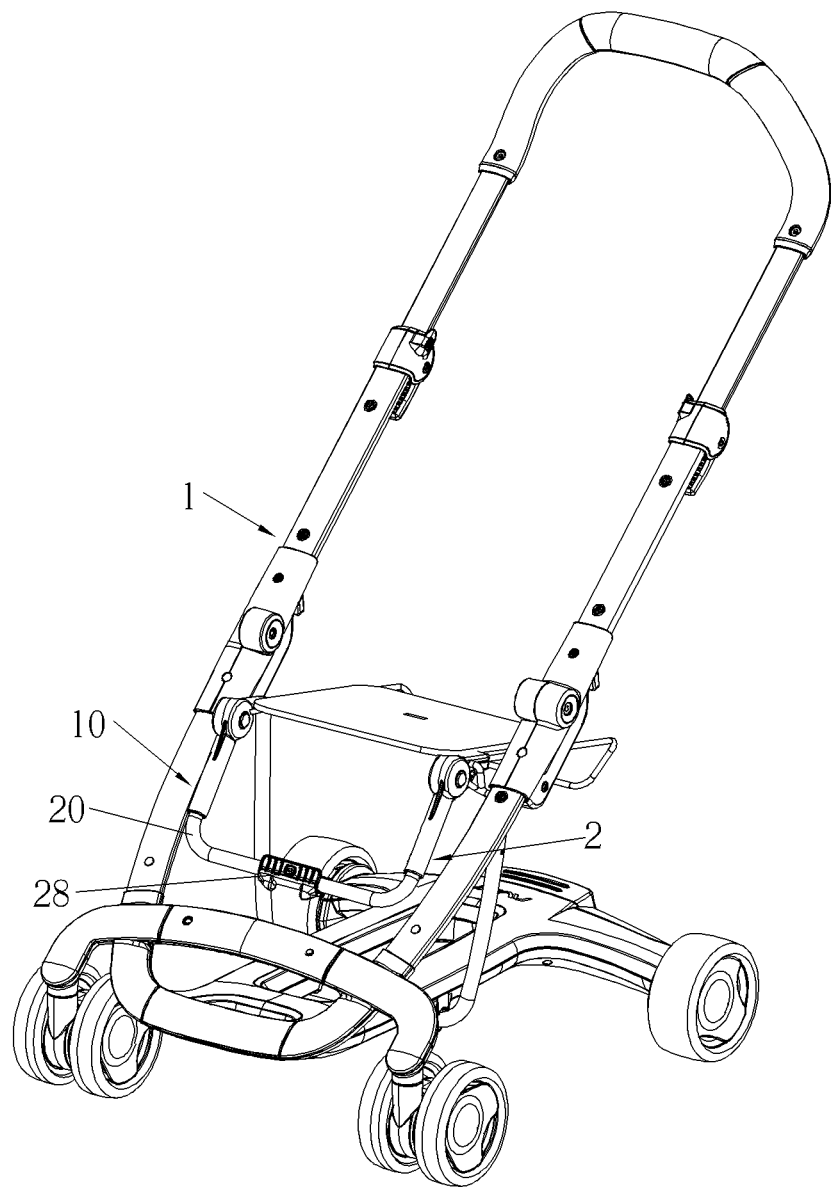
FIG. 2 is a schematic diagram illustrating the frame of the baby carriage of the invention.
Figure 3:
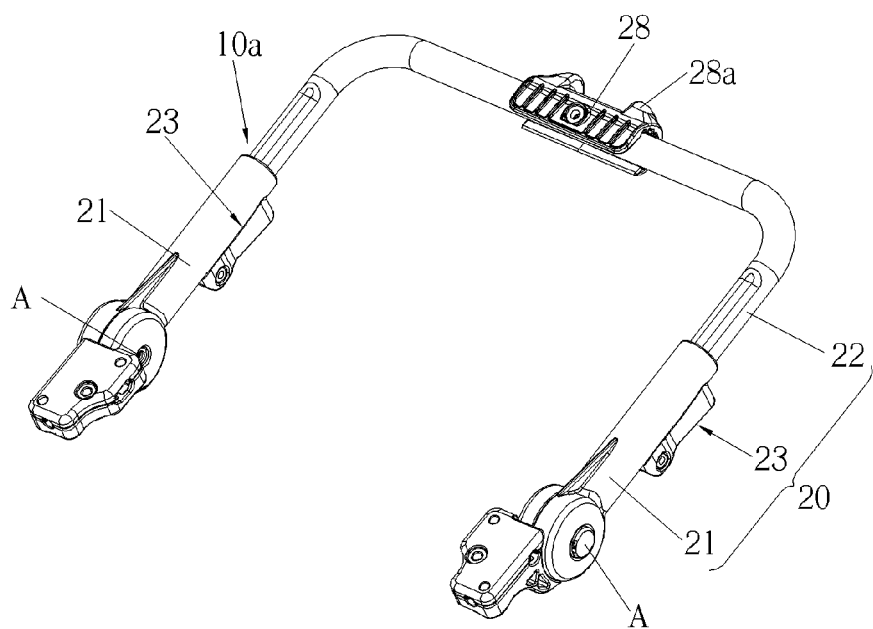
FIG. 3 is a schematic diagram illustrating the lower leg rest device shown in FIG. 2 according to a first embodiment.
Figure 4:
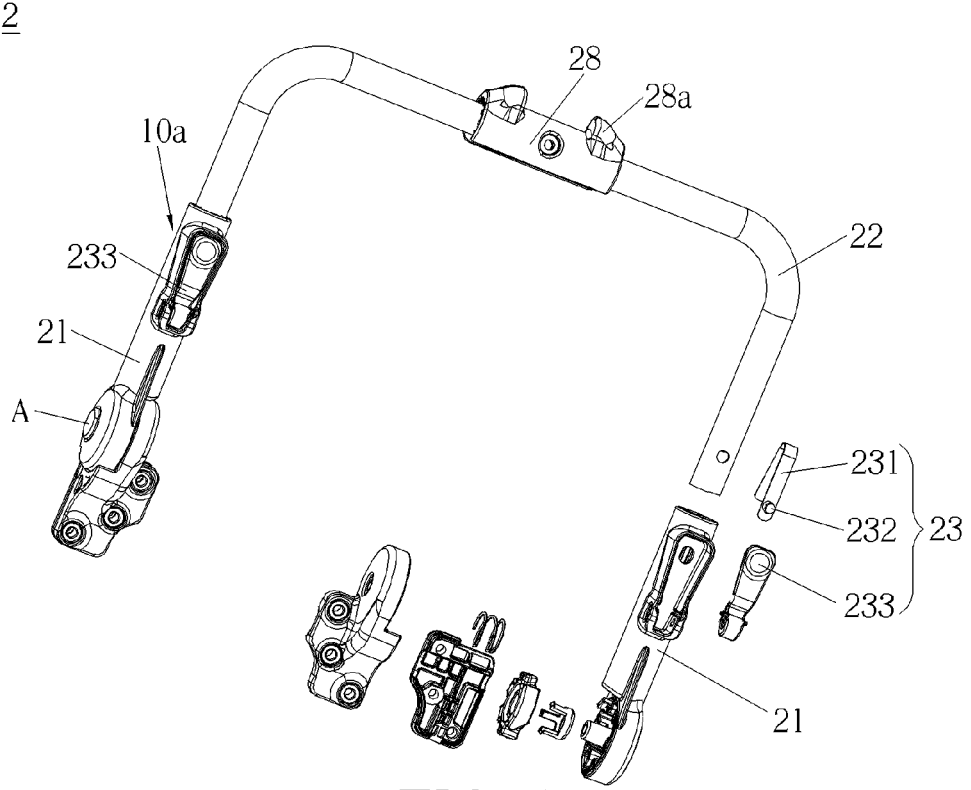
FIG. 4 is an exploded view illustrating the support member shown in FIG. 3.

As shown in FIGS. 1 and 2, a frame of a baby carriage of the invention comprises a frame body 1 and a lower leg rest device 2. The lower leg rest device 2 is pivotally connected to the frame body 1 and located in front of a seat. The lower leg rest device 2 comprises a support member 20 and an engaging member 28. An end of the support member 20 is pivotally connected to the frame body 1 and the engaging member 28 is disposed on another end of the support member 20. The support member 20 has a length adjusting mechanism 10 so a length of the support member 20 can be adjusted and used for different purposes. When the lower leg rest device 2 pivots to a position below the frame body 1, the lower leg rest device 2 can be used to support legs of a baby seated in the baby carriage so as to make the baby feel comfortable. When a child safety seat 3 has to be assembled onto the frame body 1, the lower leg rest device 2 can be pivoted upwardly with respect to the frame body 1 to a position above the seat. Accordingly, after the child safety seat 3 is assembled onto the frame body 1, the lower leg rest device 2 can be engaged with and support the child safety seat 3.

There are several embodiments described in the following with the appended drawings for the lower leg rest device 2 installed on the frame of the baby carriage of the invention.

As shown in FIGS. 3 to 7, a lower leg rest device 2 of a first embodiment of the invention comprises a support member 20 and an engaging member 28. The support member 20 has a length adjusting mechanism 10a. Specifically, the support member 20 comprises a connecting tube 21 and a support tube 22, and a first lock member 23 represents the length adjusting mechanism 10a. The connecting tube 21 is hollow. The support tube 22 is telescopically accommodated in the connecting tube 21 and pivotally connected to the frame body 1 by the connecting tube 21. Preferably, the support tube 22 is U-shaped, an end of the support tube 22 is telescopically accommodated in an end of the connecting tube 21, another end of the connecting tube 21 is pivotally connected to the frame body 1, and the engaging member 28 is fixed on the support tube 22. The engaging member 28 has an engaging portion 28a for engaging with the child safety seat 3. The connecting tube 21 is engaged with the support tube 22 by the first lock member 23. The fist lock member 23 can be operated to disengage the connecting tube from the support tube so as to pull or push the support tube 22 with respect to the connecting tube 21. In this embodiment, the first lock member 23 comprises a resilient plate 231 and an unlock button 233. The resilient plate 231 has two abutting portions 231a, 231b formed as a bent shape. A positioning block 232 protrudes from one of the abutting portions 231a. The two abutting portions 231a, 231b are disposed in the support tube 22. The abutting portion 231b is fixedly connected to the support tube 22. The positioning block 232 protrudes out of the support tube 22 and is used for engaging with and positioning the connecting tube 21. A first engaging hole 211 is formed on the connecting tube 21 and corresponding to the positioning block 232. Accordingly, when the positioning block 232 is engaged with the first engaging hole 211, the resilient plate 231 positions the connecting tube 21 and the support tube 22 in place. When the positioning block 232 is disengaged from the first engaging hole 211, the support tube 22 can be pulled or pushed with respect to the connecting tube 21. Furthermore, the unlock button 233 is disposed outside the connecting tube 21 and used for disengaging the positioning block 232 from the first engaging hole 211. An end of the unlock button 233 has a protruding block 233a corresponding to the positioning block 232, another end of the unlock button 233 is pivotally connected to the connecting tube 211, and the protruding block 233a is corresponding to the first engaging hole 211. Accordingly, when the unlock button 233 is pressed, the protruding block 233a pushes the positioning block 232 so as to disengage the positioning block 232 from the first engaging hole 211. Consequently, the support tube 22 is disengaged from the connecting tube 21.

Figure 5:
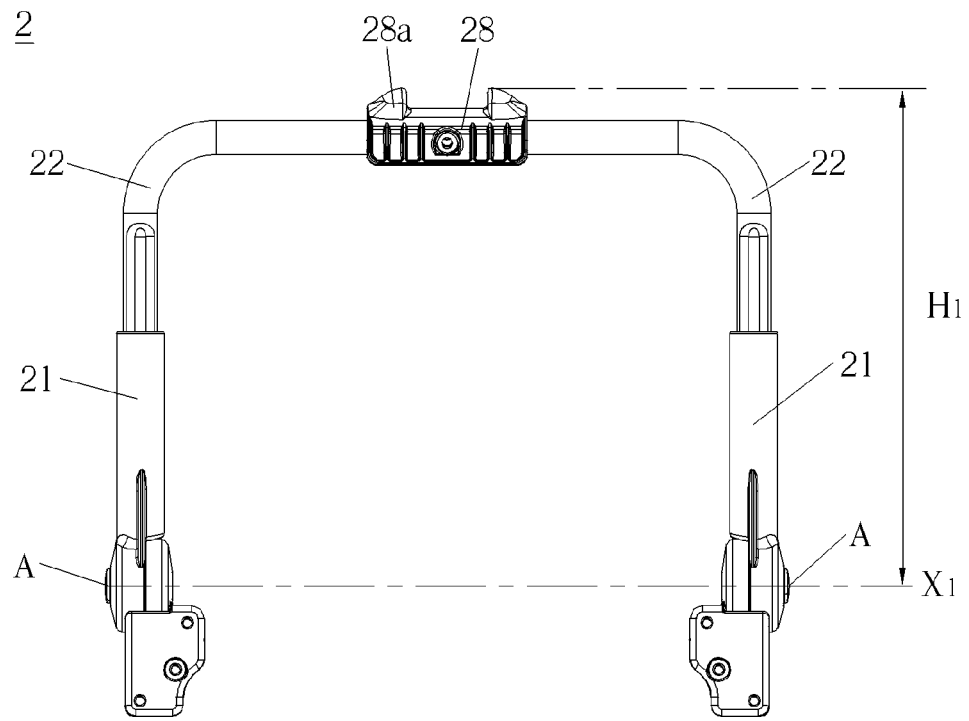
FIG. 5 is a schematic diagram illustrating the lower leg rest device shown in FIG. 3 being lengthened.
Figure 6:
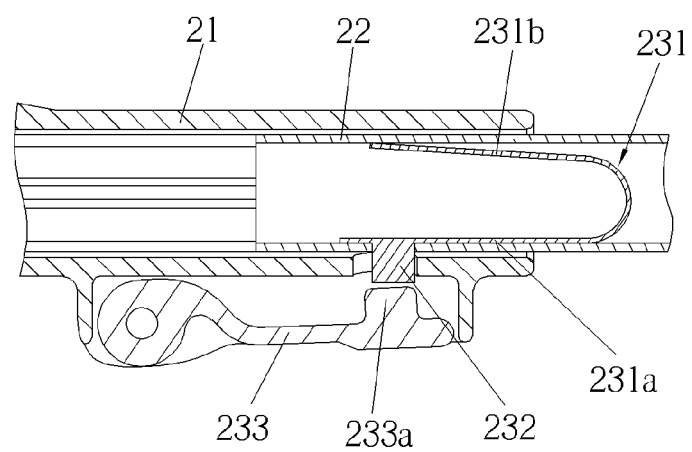
FIG. 6 is a cross-sectional view illustrating the connecting tube engaged with the support tube shown in FIG. 5.
Figure 7:
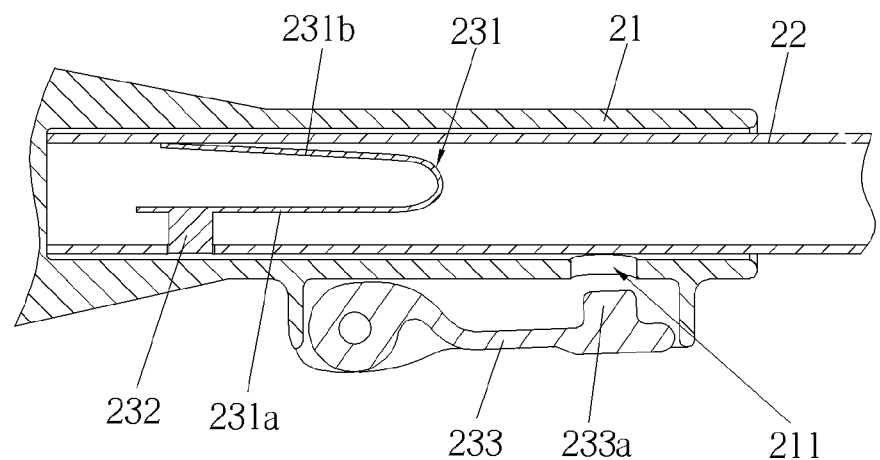
FIG. 7 is a cross-sectional view illustrating the connecting tube disengaged from the support tube shown in FIG. 5.
Figure 8:
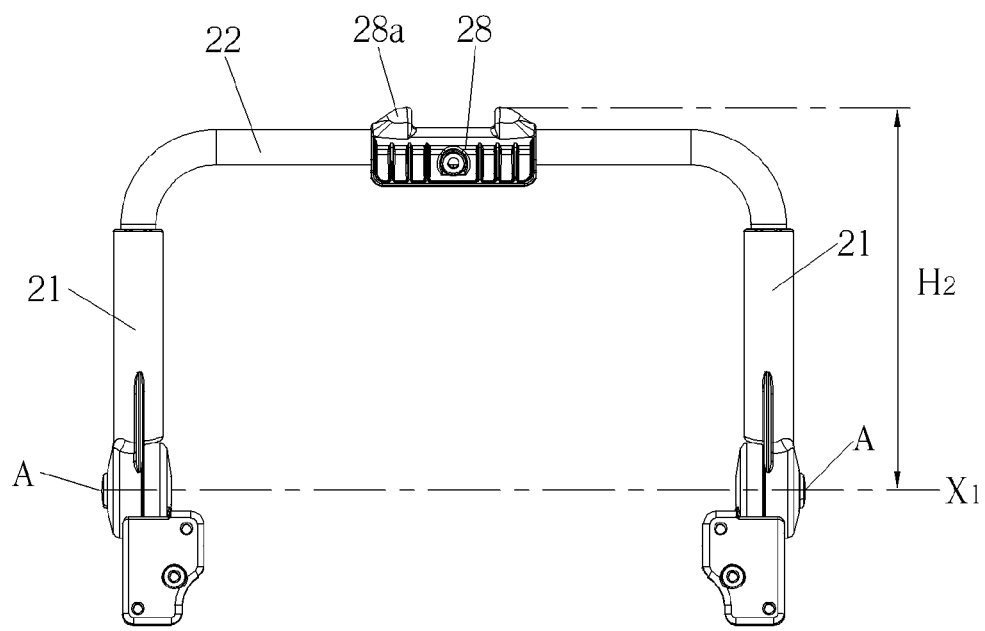
FIG. 8 is a schematic diagram illustrating the lower leg rest device shown in FIG. 6 being shortened.

In the following, FIGS. 1 and 5-8 are used to describe different states of the lower leg rest device 2 of the embodiment. When a user wants to pivot the lower leg rest device 2 to a position above the frame body 1 so as to be engaged with the child safety seat 3, the support member 20 has to be lengthened to support the child safety seat 3. Therefore, the user has to pull the support tube 22 to slide with respect to the connecting tube 21 and then the positioning block 232 is engaged with the first engaging hole 211 of the connecting tube 21 finally. Two pivot points A between the connecting tube 21 and the frame body 1 form a line X1 and a length between the engaging portion 28a and the line X1 is represented as H1, as shown in FIG. 5. In this manner, the child safety seat 3 can be engaged with the engaging portion 28a of the engaging member 28 fixed on the support tube 22 so as to support the child safety seat 3. When the lower leg rest device 2 pivots to a position below the frame body 1, the length of the support member 20 has to be shortened to simplify the lower leg rest device 2. Therefore, the user can press the unlock button 233 to drive the protruding block 233a thereon to push the positioning block 232 of the resilient plate 231 so as to disengage the positioning block 232 from the first engaging hole 211 of the connecting tube 21. Then, the user can push the support tube 22 to slide inwardly with respect to the connecting tube 21 so as to shorten the support member 20. The shortened lower leg rest device 2 is shown in FIG. 8. At this time, the length between the engaging portion 28a and the line X1 is represented as H2 and H2 is smaller than H1.

As shown in FIGS. 9 to 12, in the lower leg rest device 2 of a second embodiment of the invention, the connecting tube 21 is still telescopically connected to the support tube 22. The main difference between the aforesaid first embodiment and the second embodiment is that the second embodiment utilizes another length adjusting mechanism 10b to engage the connecting tube 21 with the support tube 22. In this embodiment, a second lock member 24 represents the length adjusting mechanism 10b. In other words, the connecting tube 21 is connected to the support tube 22 by the second lock member 24. The second lock member 24 comprises an abutting plate 241, a spring 242 and a connecting button 243. The abutting plate 241 is elastically disposed outside the connecting tube 21 and can enter the connecting tube 21 so as to be engaged with the support tube 22. Specifically, a connecting portion 212, which is hollow, protrudes from an outer surface of the connecting tube 21. A through hole 212a is formed on the connecting tube 21 and communicates with the connecting portion 212. The abutting plate 241 has a bent shape. An end of the abutting plate 241 has an engaging portion 241a and another end of the abutting plate 241 has an abutting portion 241b. A first longitudinal groove 241c is further formed on a middle portion of the abutting plate 241. When the abutting plate 241 is installed on the connecting portion 212, the abutting plate 241 is accommodated in the connecting portion 212 and pivotally connected to the connecting portion 212, and the engaging portion 241a is corresponding to the through hole 212a of the connecting tube 21. The spring 242, which is compressed, is disposed between the abutting portion 241b and an outer wall of the connecting tube 21. The engaging portion 241a passes through the through hole 212a so as to be detachably engaged with the support tube 22. An engaging groove 221 is formed on the support tube 22 and corresponding to the engaging portion 241a. Furthermore, a second longitudinal groove 212b is further formed on the connecting portion 212. A specific angle is included between the first longitudinal groove 241c and the second longitudinal groove 212b. The connecting button 243 is inserted in the second longitudinal groove 212b and the first longitudinal groove 241c sequentially so as to connect the first longitudinal groove 241c and the second longitudinal groove 212b. The connecting button 243 is used for driving the abutting plate 241 to rotate so as to unlock the support tube 22.

Figure 9:
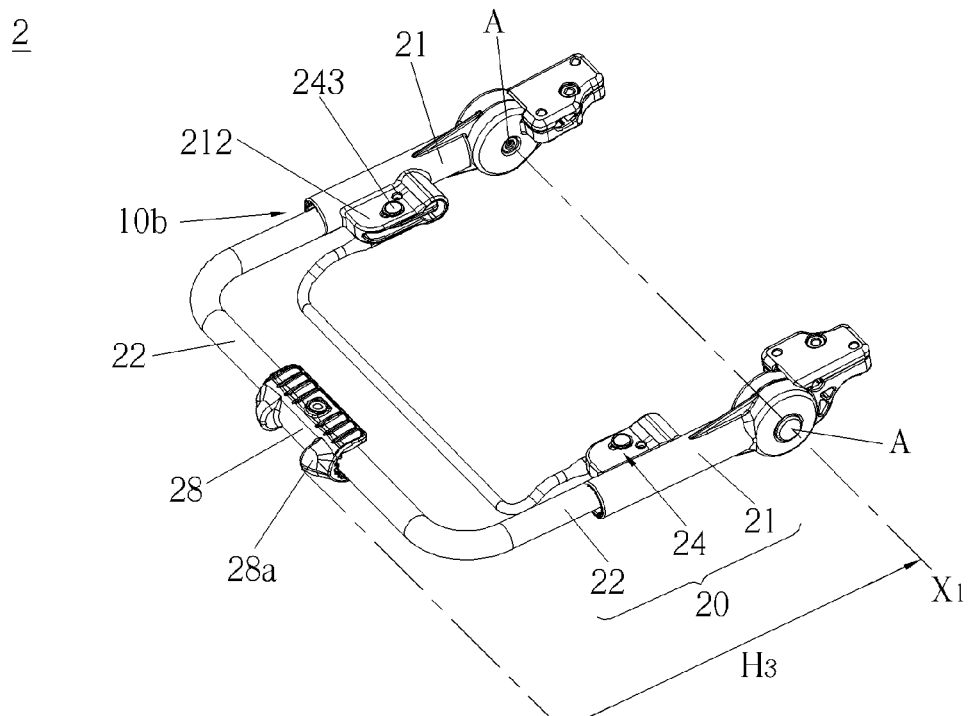
FIG. 9 is a schematic diagram illustrating the lower leg rest device shown in FIG. 2 according to a second embodiment.
Figure 10:
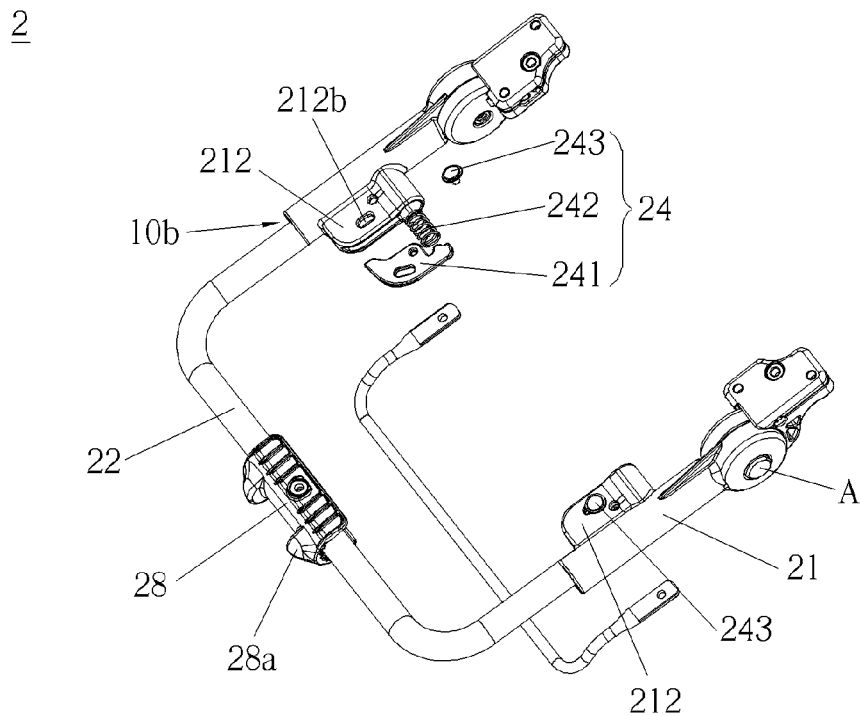
FIG. 10 is an exploded view illustrating the second lock member shown in FIG. 9.
Figure 11:
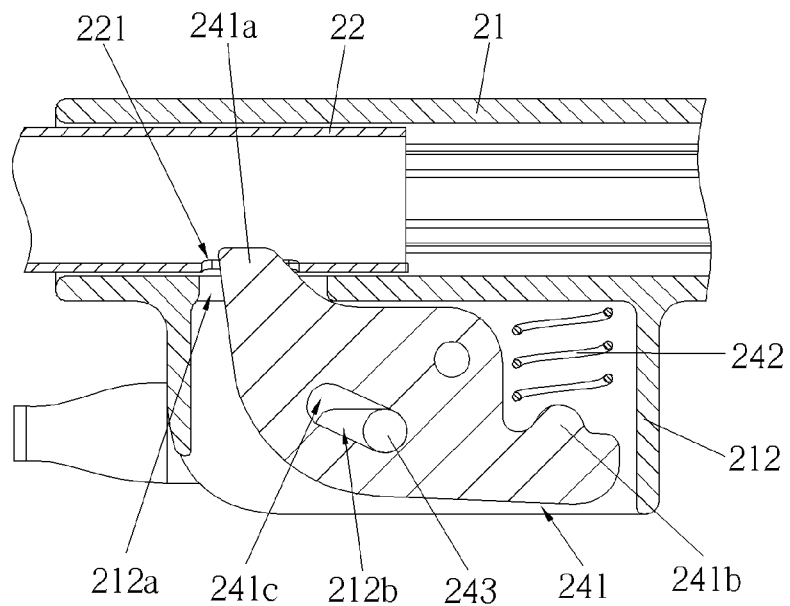
FIG. 11 is a cross-sectional view illustrating the connecting tube engaged with the support tube shown in FIG. 10.
Figure 12:
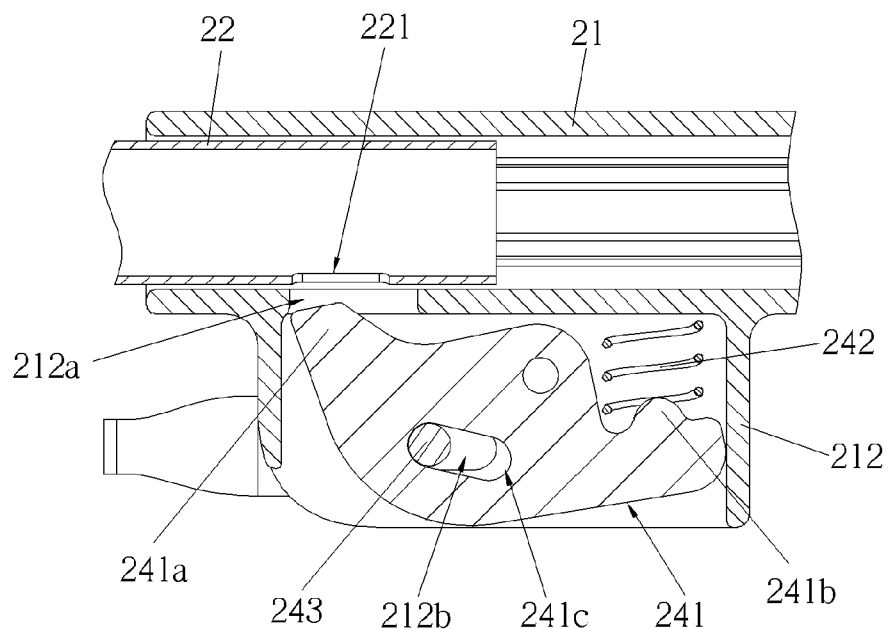
FIG. 12 is a cross-sectional view illustrating the connecting tube disengaged from the support tube shown in FIG. 10.
Figure 13:
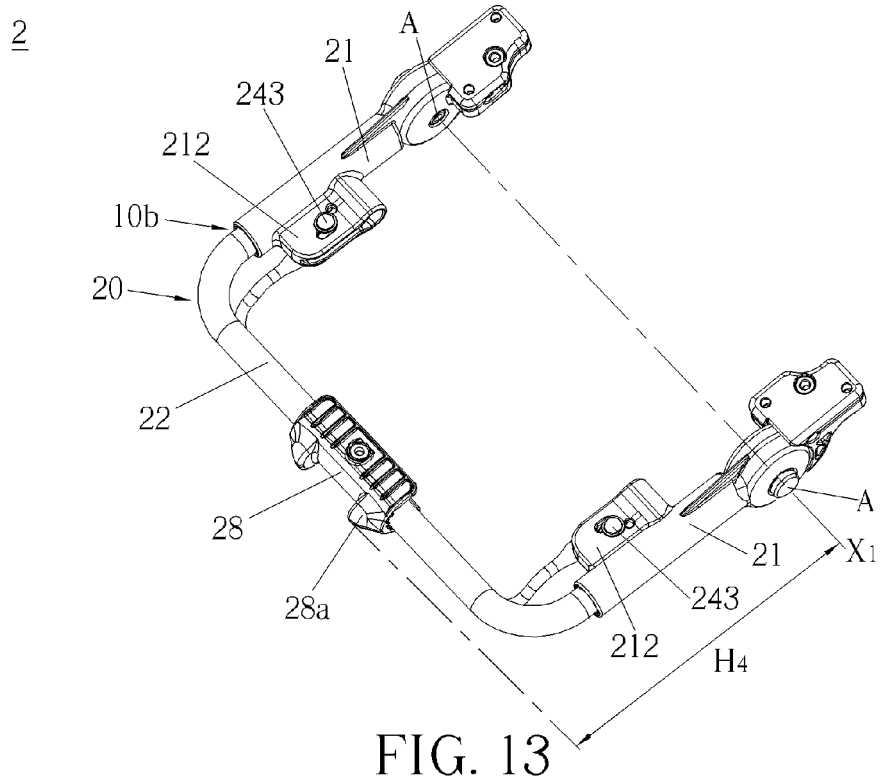
FIG. 13 is a schematic diagram illustrating the lower leg rest device shown in FIG. 9 being shortened.

In the following, FIGS. 9 to 13 are used to describe operation of the lower leg rest device 2 of the second embodiment of the invention. When the support member 20 is lengthened, the length between the engaging portion 28a and the line X1 is represented as H3, as shown in FIG. 9. When a user wants to shorten the support member 20, he or she has to operate the second lock member 24 to disengage the connecting tube 21 from the support tube 22. The user can press the connecting button 243 to make the connecting button 243 slide along the second longitudinal groove 212b of the connecting portion 212 so as to drive the abutting plate 241 to pivot. Consequently, the engaging portion 241a is disengaged from the engaging groove 221 of the support tube 22 and the abutting portion 241b compresses the spring 242. At this time, the user can push the support tube 22 to slide with respect to the connecting tube 21 so as to shorten the support member 20. The shortened lower leg rest device 2 is shown in FIG. 13. At this time, the length between the engaging portion 28a and the line X1 is represented as H4 and H4 is smaller than H3.

Figure 14:
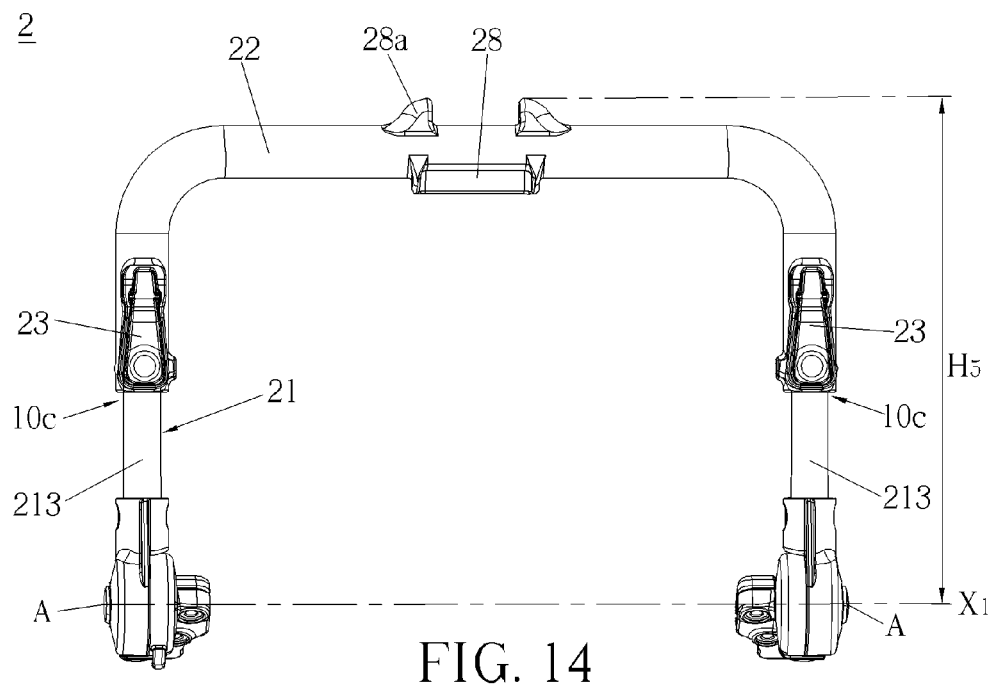
FIG. 14 is a schematic diagram illustrating the lower leg rest device shown in FIG. 2 according to a third embodiment.
Figure 15:
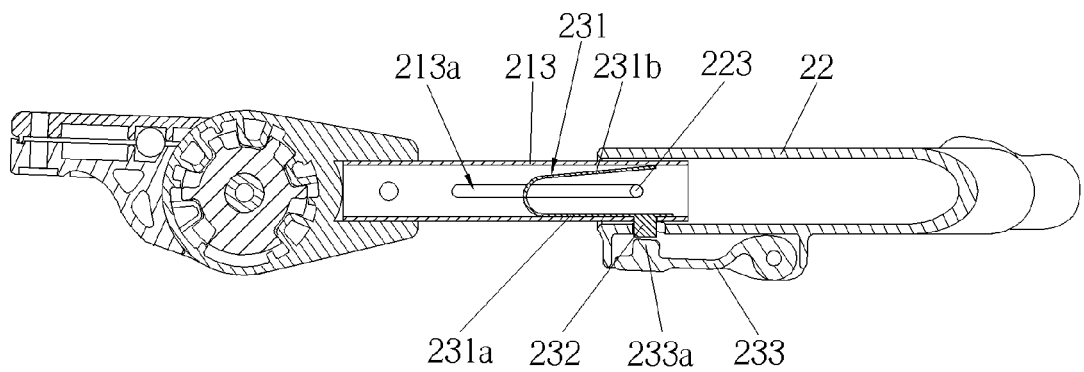
FIG. 15 is a cross-sectional view illustrating the lower leg rest device shown in FIG. 14 being lengthened.
Figure 16:
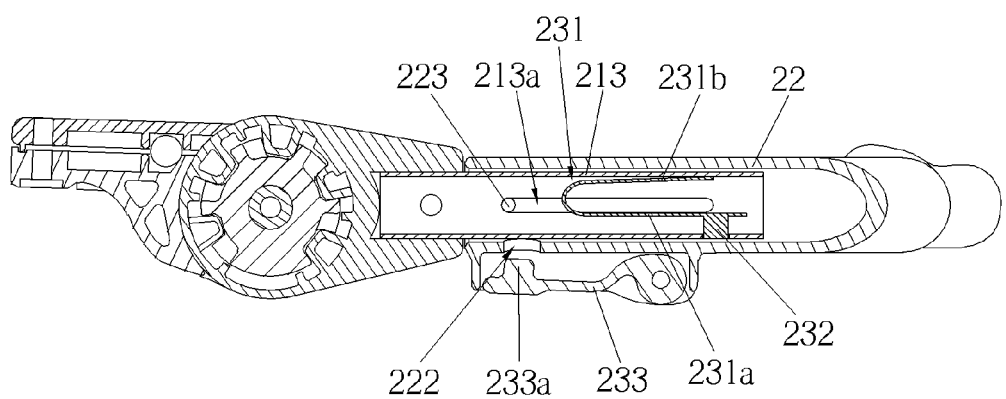
FIG. 16 is a cross-sectional view illustrating the lower leg rest device shown in FIG. 14 being shortened.

As shown in FIG. 14, in the lower leg rest device 2 of a third embodiment of the invention, the connecting tube 21 is still telescopically connected to the support tube 22. However, the connection between the connecting tube 21 and the support tube 22 is different from that of the aforesaid two embodiments. Furthermore, the engaging member 28 and the support tube 22 are formed integrally. In other words, the engaging member 28 is formed on the support tube 22 directly and used for engaging with the child safety seat 3. The engaging member 28 has an engaging portion 28a. The length adjusting mechanism 10c further comprises a connecting metal tube 213 and the connecting metal tube 213 is hollow. An end of the connecting metal tube 213 is telescopically disposed in an end of the support tube 22. The support tube 22 can be engaged with the connecting metal tube 213 by the first lock member 23 mentioned in the aforesaid first embodiment.

As shown in FIGS. 14 to 17, a restraining groove 213a is formed on one side of the connecting metal tube 213, a restraining pin 223 is fixed on an end of the support tube 22, and the restraining pin 223 is slidably disposed in the restraining groove 213a such that the support tube 22 is slidably connected to the connecting metal tube 213. The resilient plate 231 of the first lock member 23 is fixed in the connecting metal tube 213. The positioning block 232 protrudes out of the connecting metal tube 213 and is used for engaging with the support tube 22. A second engaging hole 222 is formed on the support tube 22 and corresponding to the positioning block 232.

Figure 17:
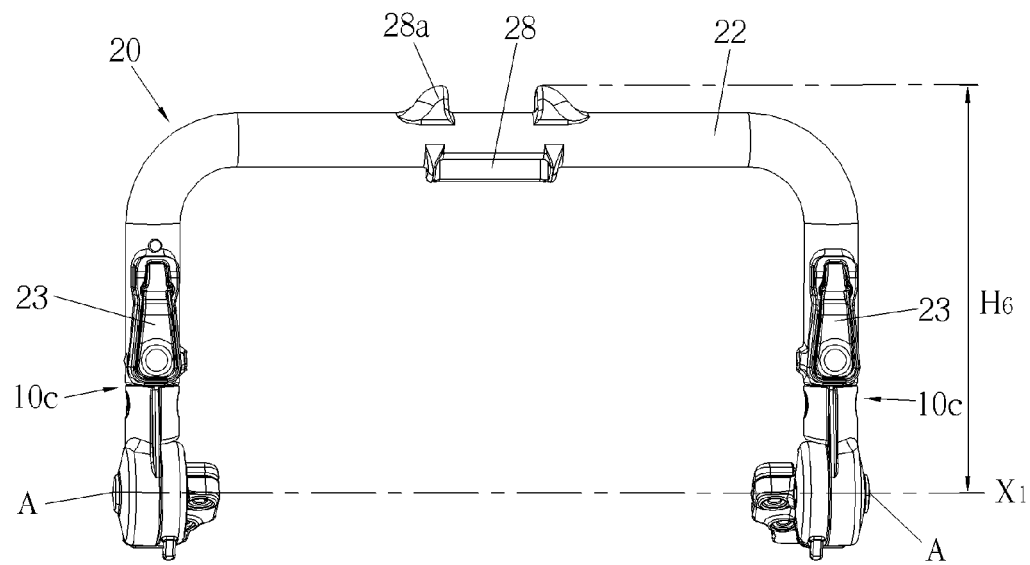
FIG. 17 is a schematic diagram illustrating the lower leg rest device shown in FIG. 14 being shortened.

When a user wants to lengthen the lower leg rest device 2, he or she can pull the support tube 22 immediately to slide with respect to the connecting metal tube 213 and the positioning block 232 will be engaged with the second engaging hole 222 of the support tube 22 finally. When the support tube 22 is pulled, the restraining pin 223 cooperates with the restraining groove 213a to prevent the support tube 22 from coming off the connecting metal tube 213. When the positioning block 232 is engaged with the second engaging hole 222 of the support tube 22, the length between the engaging portion 28a and the line X1 is represented as H5, as shown in FIG. 14. When the user wants to shorten the lower leg rest device 2, he or she can press the unlock button 233 to make the protruding block 233a to push the positioning block 232 of the resilient plate 231 so as to disengage the positioning block 232 from the second engaging hole 222 of the support tube 22. At this time, the user can push the support tube 22 to slide inwardly with respect to the connecting metal tube 213 so as to shorten the support member 20. The shortened lower leg rest device 2 is shown in FIG. 17. At this time, the length between the engaging portion 28a and the line X1 is represented as H6 and H6 is smaller than H5.

Figure 18:
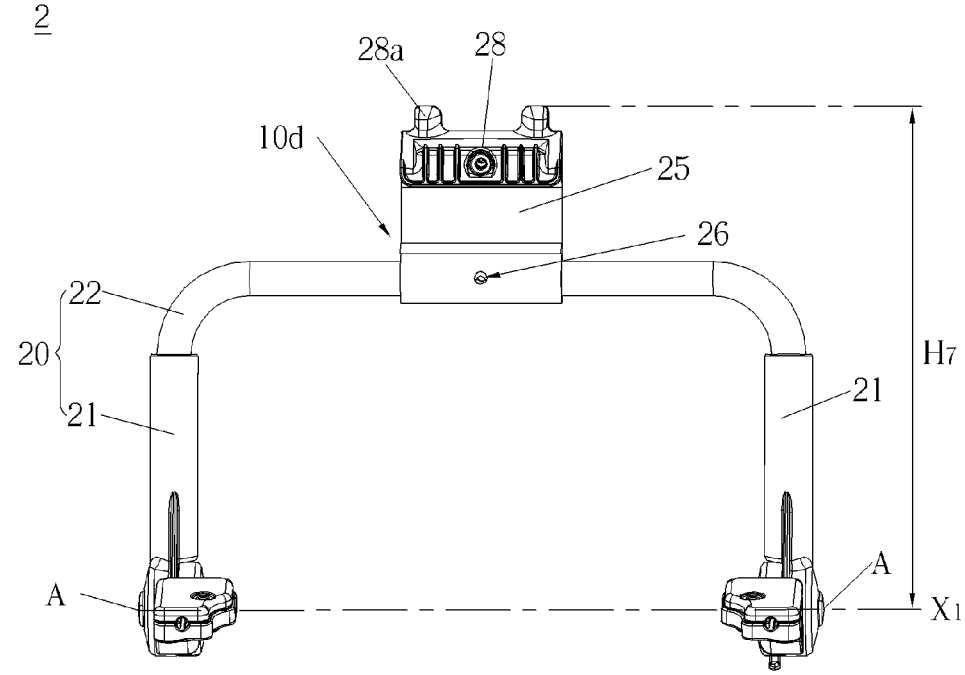
FIG. 18 is a schematic diagram illustrating the lower leg rest device shown in FIG. 2 according to a fourth embodiment.
Figure 19:
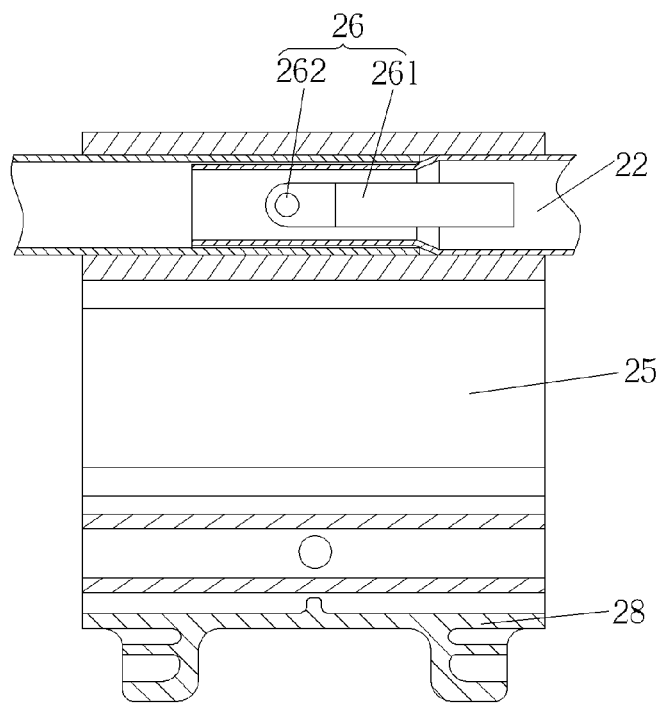
FIG. 19 is a cross-sectional view illustrating the rotating member engaged with the support tube shown in FIG. 18.

As shown in FIGS. 18 and 19, in the lower leg rest device 2 of a fourth embodiment of the invention, the design of the support member 20 is different from the aforesaid embodiments. In the aforesaid three embodiments, the connecting tube 21 and the support tube 22 of the support member 20 are telescopically connected to each other such that the length of the support member 20 can be adjusted for various using purposes. However, in this embodiment, the support tube 21 and the connecting tube 22 are connected to each other fixedly. To simplify the lower leg rest device 2 and enable the lower leg rest device 2 to support the child safety seat 3, the length of the support tube 22 is shortened and fixed on the connecting tube 21. Furthermore, a length adjusting mechanism 10d is disposed on the support member 20 so as to compensate the shortened length of the support tube 22.

Specifically, the lower leg rest device 2 of this embodiment comprises an engaging member 28 and a support member 20. The support member 20 comprises a connecting tube 21 and a support tube 22. The length adjusting mechanism 10d comprises a rotating member 25 and a first operating member 26. The connecting tube 21 is hollow and the support tube 22 is U-shaped. An end of the support tube 22 is fixed on an end of the connecting tube 21 and another end of the connecting tube 21 is pivotally connected to the frame body 1. An end of the rotating member 25 is rotatably connected to the support tube 22. The engaging member 28 is disposed on another end of the rotating member 25. The rotating member 25 and the engaging member 28 may be formed integrally or may be two separate parts connected to each other. In this embodiment, the rotating member 25 and the engaging member 28 are two separate parts tightly connected to each other. The rotating member 25 is engaged with the support tube 22 by the first operating member 26. The first operating member 26 can be used to disengage the rotating member 25 from the support tube 22 so as to rotate the rotating member 25. In this embodiment, the first operating member 26 is a resilient positioning pillar 262. The resilient positioning pillar 262 is fixed in the support tube 22 and protrudes out of the support tube 22. A positioning hole 251 is formed on the rotating member 25 and corresponding to the resilient positioning pillar 262. The resilient positioning pillar 262 is detachably engaged with the positioning hole 251. To support the child safety seat 3, the rotating member 25 can be rotated to the outer side of the support tube 22 and then engaged and positioned by the first operating member 26 so as to lengthen the length of the support member 20. When the child safety seat 3 is removed, the first operating member 26 can be unlocked to rotate the rotating member 25 to the inner side of the support tube 22 so as to simplify the support member 20.

As shown in FIG. 19, preferably, the first operating member 26 comprises a resilient plate 261 with a bent shape and a positioning pillar 262 protrudes from the resilient plate 261. The resilient plate 261 is fixed in the support tube 22. The positioning pillar 262 protrudes out of the support tube 22 so as to be engaged with the positioning hole 251 of the rotating member 25.

Figure 20:
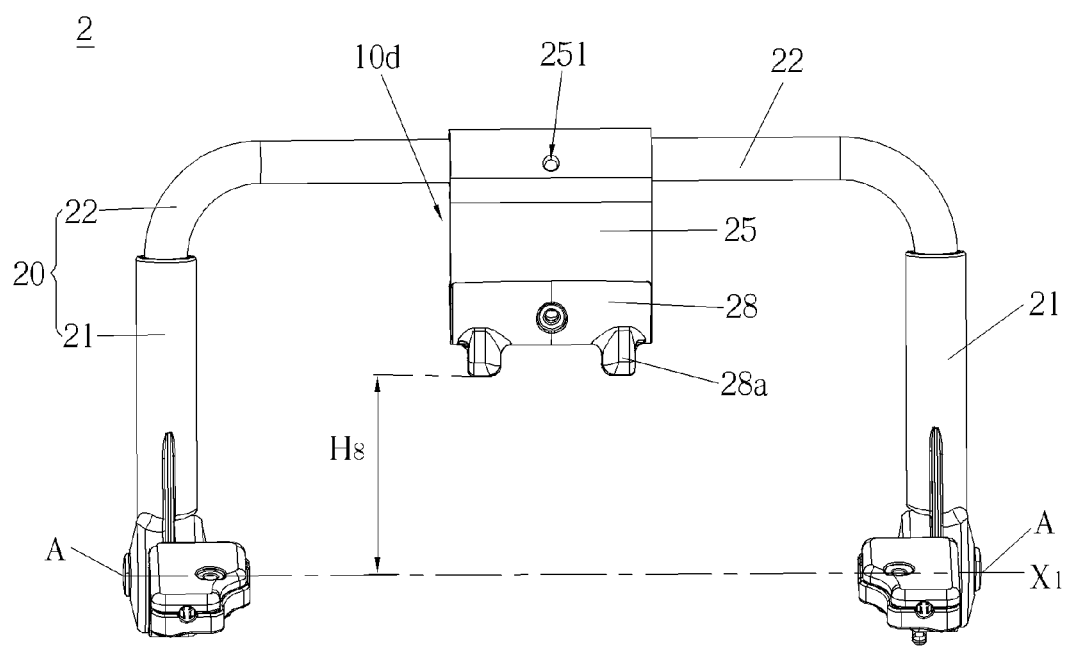
FIG. 20 is a schematic diagram illustrating the rotating member shown in FIG. 18 after rotation.

In the following, FIGS. 1 and 18-20 are used to describe operation of the lower leg rest device 2 of this embodiment. When the lower leg rest device 2 is used to support the child safety seat 2, the rotating member 25 is rotated to the outer side of the support tube 22. At this time, the positioning pillar 262 of the first operating member 26 is engaged with the positioning hole 251 of the rotating member 25. The rotating member 25 can compensate the shortened length of the support tube 22. Accordingly, the engaging member 28, which is disposed on another end of the rotating member 25, can be engaged with and support the child safety seat 3. Two pivot points A between the connecting tube 21 and the frame body 1 still form a line X1 and a distance between the engaging portion 28a of the engaging member 28 and the line X1 is represented as H7, as shown in FIG. 18. When the lower leg rest device 2 needs to be rotated to a position below the seat, the rotating member 25 has to be rotated to the inner side of the support tube 22 first. The user can press the positioning pillar 262 of the first operating member 26 immediately so as to disengage the positioning pillar 262 from the positioning hole 251 of the rotating member 25. Consequently, the rotating member 25 can be rotated to the inner side of the support tube 22, as shown in FIG. 20. At this time, the distance between the engaging portion 28a of the engaging member 28 and the line X1 is represented as H8 and H8 is smaller than H7.

Figure 21:
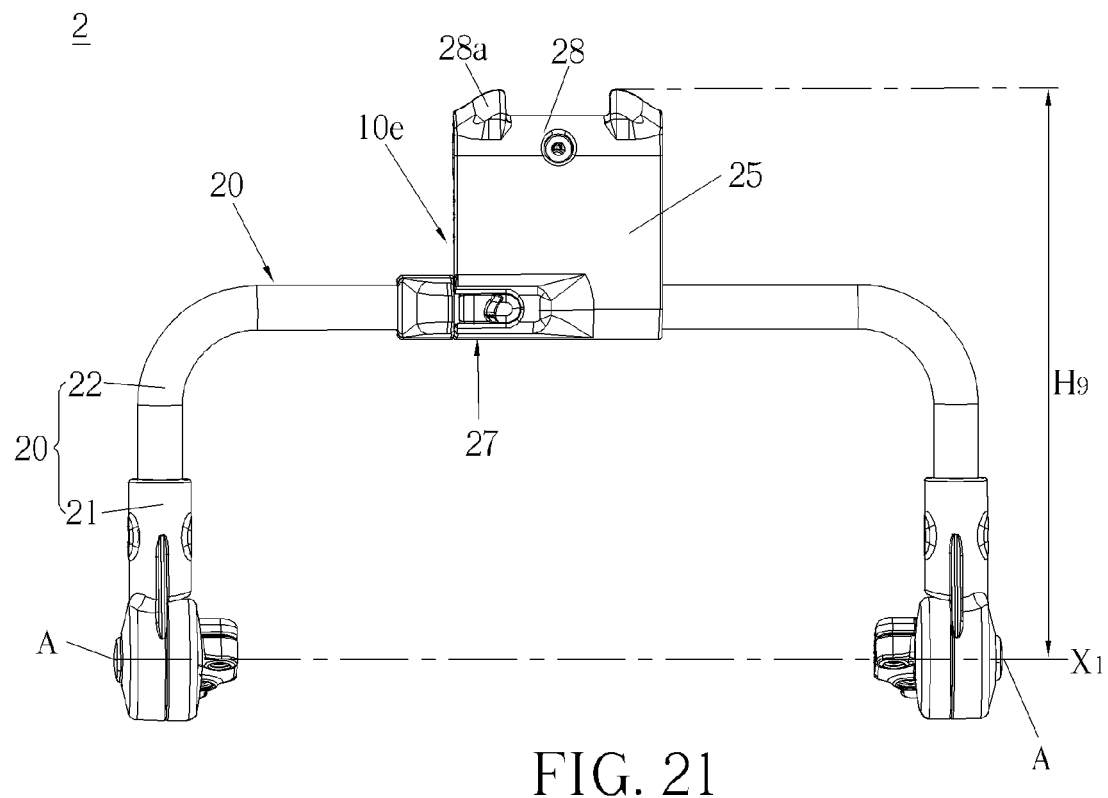
FIG. 21 is a schematic diagram illustrating the lower leg rest device shown in FIG. 2 according to a fifth embodiment.
Figure 22:
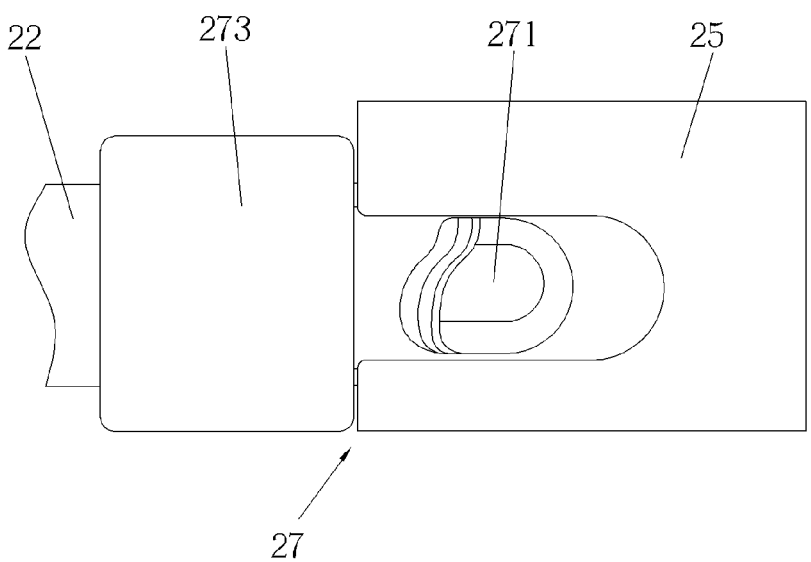
FIG. 22 is a schematic diagram illustrating the rotating member engaged with the support tube shown in FIG. 21.
Figure 23:
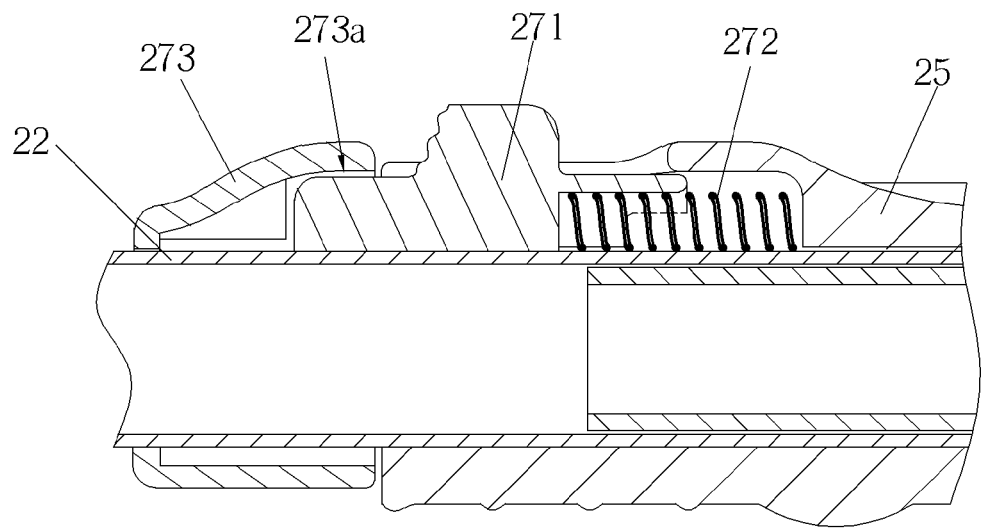
FIG. 23 is a cross-sectional view of FIG. 22.
Figure 24:
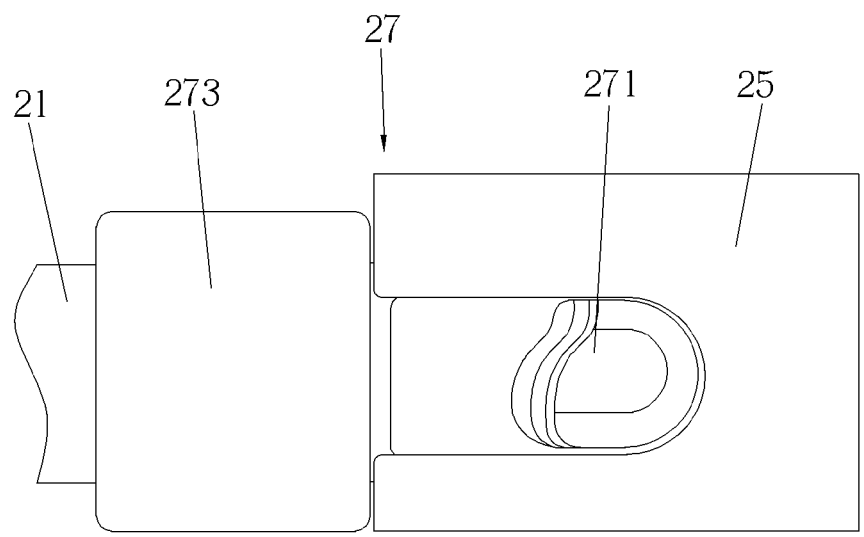
FIG. 24 is a schematic diagram illustrating the rotating member disengaged from the support tube shown in FIG. 21.
Figure 25:
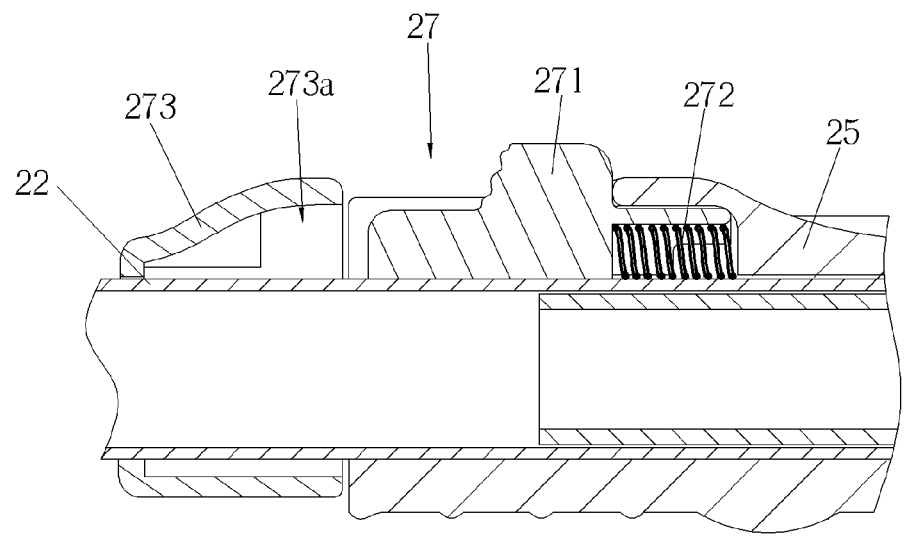
FIG. 25 is a cross-sectional view of FIG. 24.

As shown in FIG. 21, in the lower leg rest device 2 of a fifth embodiment of the invention, the structure of the support member 20 is the same as that of the aforesaid fourth embodiment. The main difference between the fifth embodiment and the fourth embodiment is that the support tube 22 and the rotating member 25 are engaged with each other by a second lock member 27 of a length adjusting mechanism 10e. The second lock member 27 comprises an operating button 271, a spring 272 and a positioning ring 273. The positioning ring 273 is fixed on the support tube 22 and located at one side of the rotating member 25. A positioning groove 273a is formed inside the positioning ring 273. The operating button 271 is slidably connected to an end of the rotating member 25 and corresponding to the positioning ring 273. The spring 272 is elastically disposed between a rear end of the operating button 271 and the rotating member 25. A front end of the operating button 271 is detachably engaged with the positioning groove 273a of the positioning ring 273.

Figure 26:
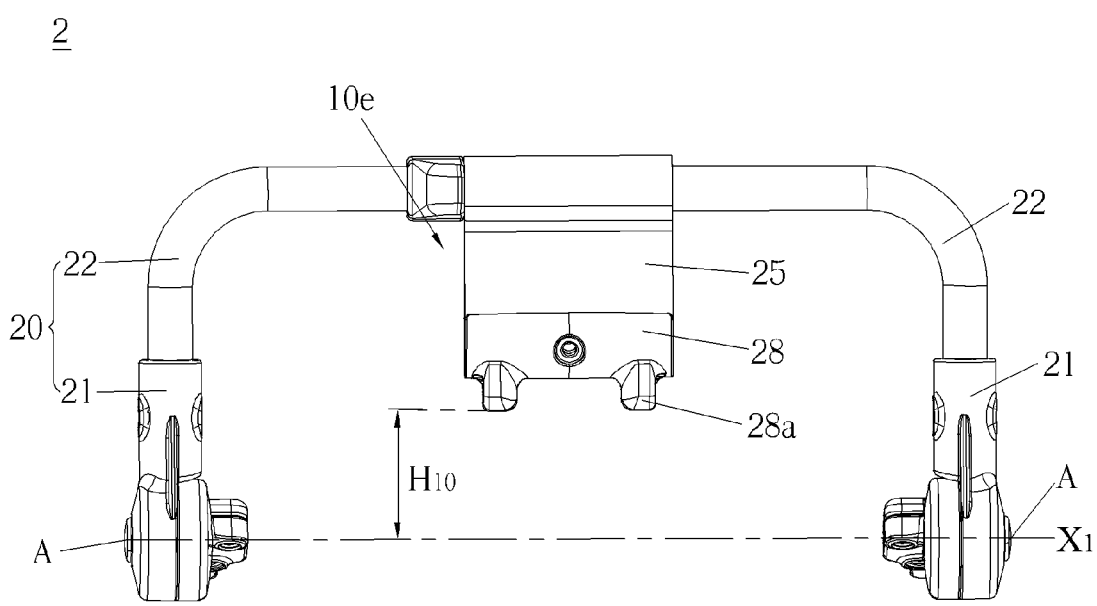
FIG. 26 is a schematic diagram illustrating the rotating member shown in FIG. 21 after rotation.

In the following, FIGS. 1 and 21-26 are used to describe operation of the lower leg rest device 2 of the fifth embodiment. When the lower leg rest device 2 is used to support the child safety seat 2, the rotating member 25 is rotated to the outer side of the support tube 22. At this time, the front end of the operating button 271 of the second lock member 27 is engaged with the positioning groove 273a of the positioning ring 273. Accordingly, the engaging member 28, which is disposed on another end of the rotating member 25, can be engaged with and support the child safety seat 3. Two pivot points A between the connecting tube 21 and the frame body 1 still form a line X1 and a distance between the engaging portion 28a of the engaging member 28 and the line X1 is represented as H9, as shown in FIG. 21. When the rotating member 25 needs to be rotated to the inner side of the support tube 22, the user can slide the operating button 271 backwardly so as to disengage the front end of the operating button 271 from the positioning groove 273a of the positioning ring 273. Accordingly, the rotating member 25 can be rotated to the inner side of the support tube 22, as shown in FIG. 26. At this time, the distance between the engaging portion 28a of the engaging member 28 and the line X1 is represented as H10 and H10 is smaller than H9.

When the rotating member 25 needs to be positioned again, the rotating member 25 can be rotated to align the operating button 271 with the positioning groove 273a of the positioning ring 273. At this time, the spring 272, which is disposed behind the operating button 271, generates elastic force for pushing the operating button 271 such that the front end of the operating button 271 is engaged with the positioning groove 273a and then the rotating member 25 is positioned in place.

Figure 27:
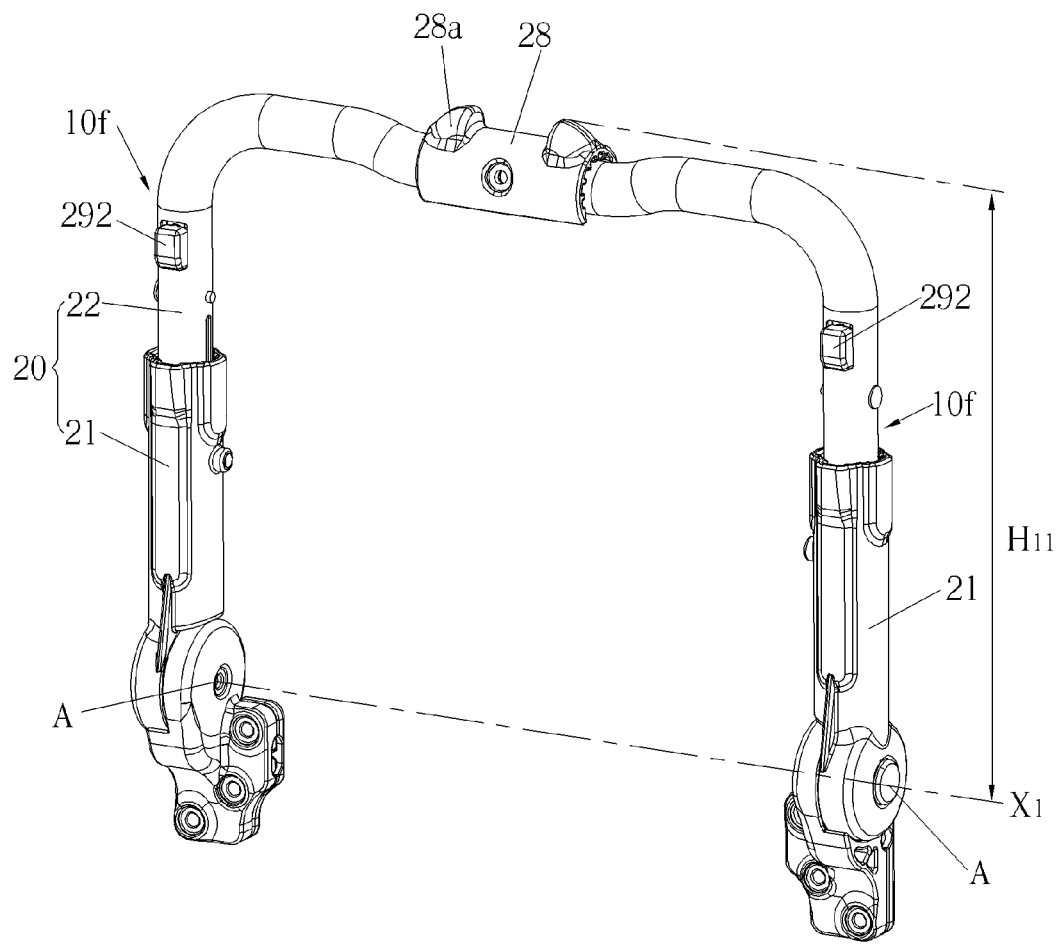
FIG. 27 is a schematic diagram illustrating the lower leg rest device shown in FIG. 2 according to a sixth embodiment.
Figure 28:
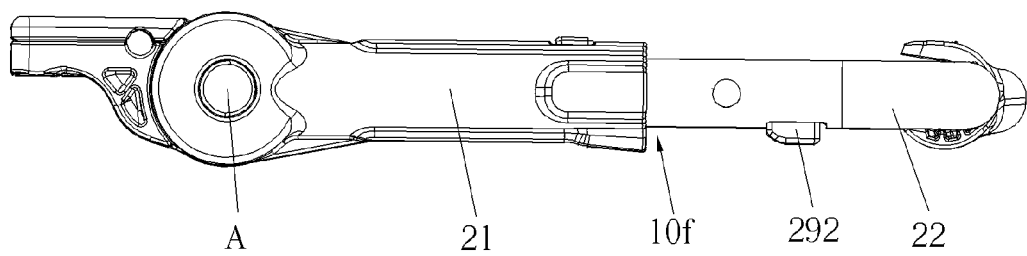
FIG. 28 is a side view illustrating the lower leg rest device shown in FIG. 27.
Figure 29:
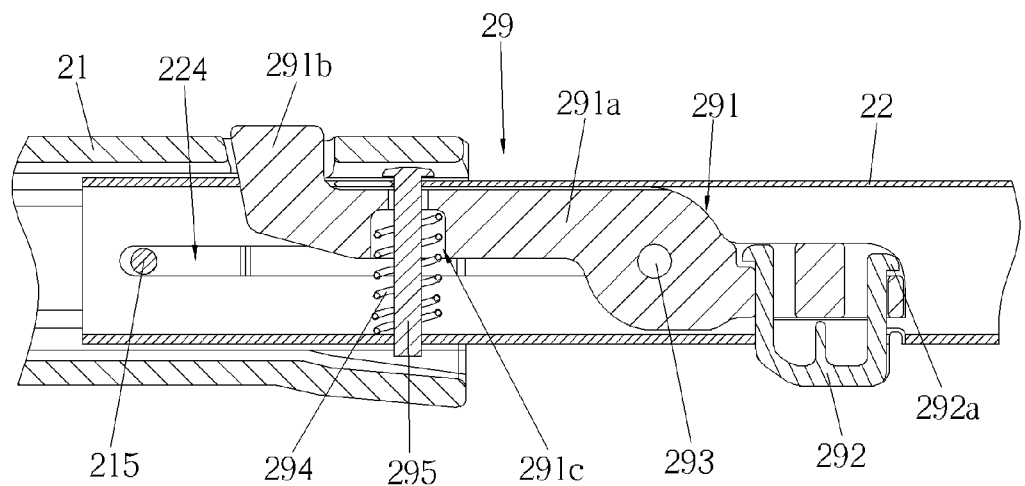
FIG. 29 is a cross-sectional view illustrating the connecting tube engaged with the support tube shown in FIG. 27.
Figure 30:
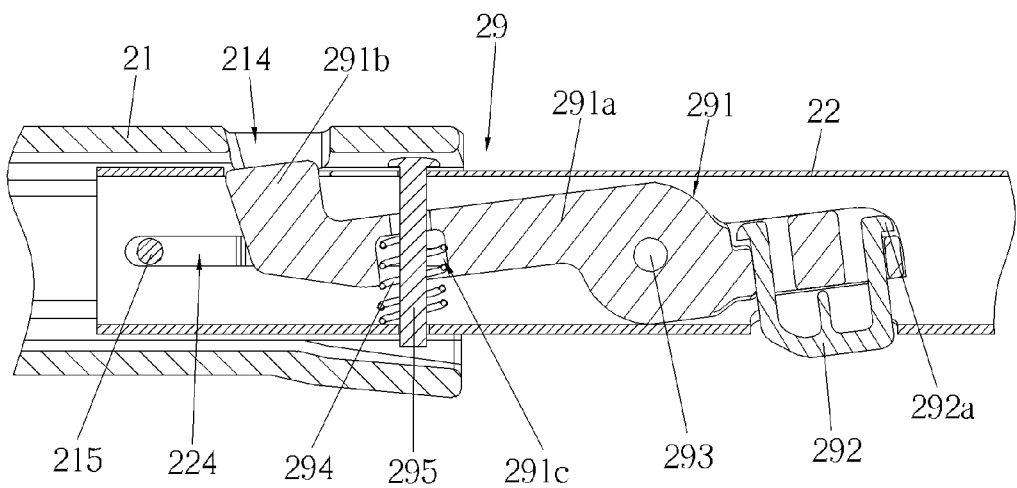
FIG. 30 is a cross-sectional view illustrating the connecting tube disengaged from the support tube shown in FIG. 27.

As shown in FIG. 27, in the lower leg rest device 2 of a sixth embodiment of the invention, the structure and connection of the connecting tube 21 and the support tube 22 are the same as those of the aforesaid first and second embodiments. The main difference between the sixth embodiment and the first and second embodiments is the length adjusting mechanism 10f for connecting the connecting tube 21 and the support tube 22.

As shown in FIGS. 27 to 30, in this embodiment, the connecting tube 21 is engaged with the support tube 22 by a third lock member 29 of the length adjusting mechanism 10f. The third lock member 29 comprises an engaging block 291, a button 292, a pivot axle 293 and a resilient member. In this embodiment, the resilient member is preferably a spring 294. Specifically, the engaging block 291 has a longitudinal base portion 291a with a bent shape. An end of the base portion 291a has an engaging protrusion 291b bent toward one side. A positioning groove 291c is formed on another end of the base portion 291a and close to the engaging protrusion 291b. The positioning groove 291c and the engaging protrusion 291b are located at opposite sides. Furthermore, a through hole is formed on the base portion 291a and corresponding to the positioning groove 291c. The through hole communicates with the positioning groove 291c. The engaging block 291 is accommodated in the support tube 22. The pivot axle 293 passes through the base portion 291a such that the engaging block 291 is connected in the support tube 22. Therefore, the axial direction of the pivot axle 293 is the same as the radial direction of the support tube 22. On the other side of the base portion 291a, an end of the spring 294 is accommodated in the positioning groove 291c and another end of the spring 294 abuts against an inner wall of the support tube 22. A positioning pillar 295 is inserted into the through hole of the base portion 291a and the spring 294 sequentially so as to connect the support tube 22, the base portion 291a and the spring 294 together. The axial direction of the positioning pillar 295 is perpendicular to the axial direction of the pivot axle 293. Accordingly, the engaging protrusion 291b protrudes out of the support tube 22 due to an elastic force generated by the spring 294. A third engaging hole 214 is formed on the connecting tube 21 and corresponding to the engaging protrusion 291b.

The button 292 is inserted into the support tube 22 from another side of the support tube 22 and then engaged with the base portion 291a. Accordingly, the button 292 and the engaging protrusion 291b are located at opposite sides of the base portion 291a and extend toward opposite directions of the base portion 291a. Specifically, the button 292 has engaging portions 292a bent outwardly. The button 292 is inserted into the support tube 22 and then engaged with an end of the base portion 291a, which is opposite to the engaging protrusion 291b, by the engaging portions 292a. Furthermore, a restraining groove 224 is formed on the support tube 22, a restraining pin 215 is disposed on the connecting tube 21, and the restraining pin 215 is disposed in the restraining groove 224. Accordingly, the restraining pin 215 can cooperate with the restraining groove 224 to prevent the support tube 22 from coming off the connecting tube 21.

Figure 31:
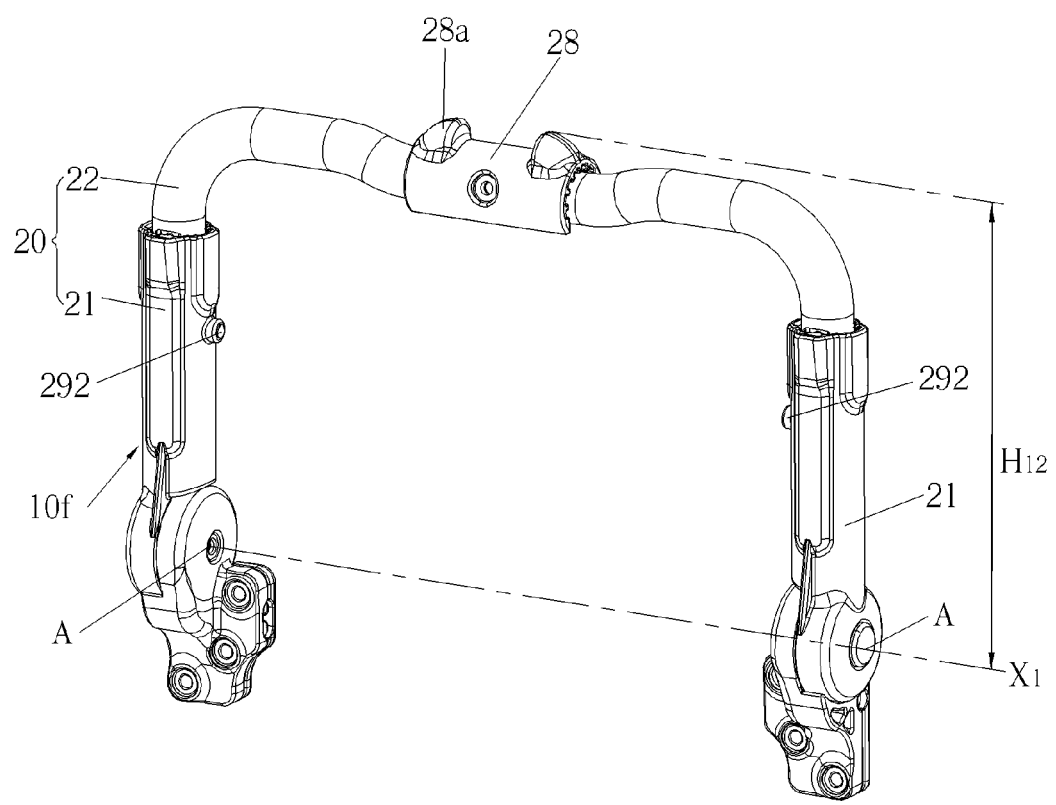
FIG. 31 is a schematic diagram illustrating the lower leg rest device shown in FIG. 27 being shortened.

In the following, FIGS. 27 to 31 are used to describe operation of the lower leg rest device 2 of the sixth embodiment of the invention. When the support member 20 is lengthened, the length between the engaging portion 28a and the line X1 is represented as H11, as shown in FIG. 27. When a user wants to shorten the support member 20, he or she has to operate the third lock member 29 to disengage the connecting tube 21 from the support tube 22. The user can press the button 292 to make the button 292 push the engaging block 291 to pivot on the pivot axle 293 such that the button 292 slides into the support tube 22 and the engaging protrusion 291b moves into the support tube 22. At the same time, the base portion 291a compresses the spring 294. When the engaging protrusion 291b is disengaged from the third engaging hole 214 of the connecting tube 21, the support tube 22 can be pushed to slide into the connecting tube 21 so as to shorten the support member 20. The shortened lower leg rest device 2 is shown in FIG. 31. At this time, the length between the engaging portion 28a and the line X1 is represented as H12 and H12 is smaller than H11.

As mentioned in the above, the lower leg rest device of the invention comprises the engaging member and the support member with the length adjusting mechanism, an end of the support member is pivotally connected to the frame body of the baby carriage, and the engaging member is disposed on another end of the support member such that the length of the support member can be adjusted by the length adjusting mechanism. Accordingly, when the lower leg rest device pivots to a position below the frame body, the distance between the engaging portion of the engaging member and the line X1 can be shortened to form a simplified structure so as to support legs of a baby seated in the baby carriage. When the lower leg rest device pivots to a position above the frame body, the distance between the engaging portion of the engaging member and the line X1 can be lengthened so that the engaging member disposed thereon can be engaged with and support the child safety seat. The lower leg rest device has simple structure and can be operated conveniently.

The lower leg rest device of the invention is pivotally connected to the frame body. The structure of the frame body can be implemented by one skilled in the art and will not be depicted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lower leg rest device pivotally connected to a frame of a baby carriage comprising:
   an engaging member; and
   a support member having a length adjusting mechanism, an end of the support member being pivotally connected to the frame of the baby carriage at a pivot point, the engaging member being disposed on another end of the support member, the support member being used for supporting a child safety seat, the length adjusting mechanism being used for adjusting a length between the engaging member and the pivot point;
   wherein the support member comprises a connecting tube and a support tube, the support tube is U-shaped, an end of the support tube is telescopically connected to an end of the connecting tube by the length adjusting mechanism, another end of the connecting tube is pivotally connected to the frame of the baby carriage, the engaging member is disposed on the support tube, the connecting tube is hollow, an end of the support tube is telescopically accommodated in an end of the connecting tube, the support tube is detachably engaged with the connecting tube by a lock member, the lock member comprises a button, an engaging block and a resilient member, the engaging block is pivotally connected to the support tube, an end of the engaging block is detachably engaged with the connecting tube, the button is disposed on another end of the engaging block and protrudes out of the support tube, the resilient member is elastically disposed between the engaging block and the support tube, a restraining groove is formed on the support tube, a restraining pin is disposed on the connecting tube, and the restraining pin is disposed in the restraining groove.

2. The lower leg rest device of claim 1, wherein the engaging block has a base portion, an end of the base portion has an engaging protrusion, the button is disposed on another end of the base portion, the engaging protrusion and the button extend toward opposite directions with respect to the base portion, the resilient member and the button are located at an identical side of the base portion.

3. The lower leg rest device of claim 2, wherein a third engaging hole is formed on the connecting tube and corresponding to the engaging protrusion.

4. A frame of a baby carriage comprising:
a frame body; and
a lower leg rest device pivotally connected to the frame body, the lower leg rest device comprising:
  an engaging member; and
  a support member having a length adjusting mechanism, an end of the support member being pivotally connected to the frame of the baby carriage at a pivot point, the engaging member being disposed on another end of the support member, the support member being used for supporting a child safety seat, the length adjusting mechanism being used for adjusting a length between the engaging member and the pivot point
  wherein the support member comprises a connecting tube and a support tube, the support tube is U-shaped, an end of the support tube is telescopically connected to an end of the connecting tube by the length adjusting mechanism, another end of the connecting tube is pivotally connected to the frame of the baby carriage, the engaging member is disposed on the support tube, the connecting tube is hollow, an end of the support tube is telescopically accommodated in an end of the connecting tube, the support tube is detachably engaged with the connecting tube by a lock member, the lock member comprises a button, an engaging block and a resilient member, the engaging block is pivotally connected to the support tube, an end of the engaging block is detachably engaged with the connecting tube, the button is disposed on another end of the engaging block and protrudes out of the support tube, the resilient member is elastically disposed between the engaging block and the support tube, a restraining groove is formed on the support tube, a restraining pin is disposed on the connecting tube, and the restraining pin is disposed in the restraining groove.

5. The frame of the baby carriage of claim 4, wherein when the lower leg rest device pivots to a position below the frame body, the lower leg rest device is used for supporting legs of a baby; when the lower leg rest device pivots to a position above the frame body, the lower leg rest device is used for engaging with and supporting the child safety seat.

* * * * *